INVENTORS
JOHAN CLAES GEORG BORGSTRÖM
BERNHARD LILLSUNDE
BY Hane and Nydick
ATTORNEYS Jan. 25, 1966 J. C. G. BORGSTRÖM ETAL 3,231,684

CONTROL REGISTER FOR A MULTI-EXCHANGE TELEPHONE SYSTEM

Filed March 28, 1961 8 Sheets-Sheet 2

INVENTORS
JOHAN CLAES GEORG BORGSTRÖM
BERNHARD LILLSUNDE
BY Hane and Nydick
ATTORNEYS INVENTORS
JOHAN CLAES GEORG BORGSTRÖM
BERNHARD LILLSUNDE
By Hane and Nydick
ATTORNEYS INVENTORS
JOHAN CLAES GEORG BORGSTRÖM
BERNHARD LILLSUNDE
BY Hane and Nydick
ATTORNEYS

CONTROL REGISTER FOR A MULTI-EXCHANGE TELEPHONE SYSTEM

Filed March 28, 1961

INVENTORS
JOHAN CLAES GEORG BORGSTRÖM
BERNHARD LILLSUNDE
BY Hane and Nydick
ATTORNEYS INVENTORS
JOHAN CLAES GEORG BORGSTRÖM
BERNHARD LILLSUNDE
BY Hane and Nydick
ATTORNEYS

CONTROL REGISTER FOR A MULTI-EXCHANGE TELEPHONE SYSTEM

Filed March 28, 1961

8 Sheets-Sheet 7

INVENTORS
JOHAN CLAES GEORG BORGSTRÖM
BERNHARD LILLSUNDE
BY Hane and Nydick
ATTORNEYS INVENTORS
JOHAN CLAES GEORG BORGSTRÖM
BERNHARD LILLSUNDE
By Hane and Nydick
ATTORNEYS United States Patent Office 3,231,684
Patented Jan. 25, 1966

3,231,684
CONTROL REGISTER FOR A MULTI-EXCHANGE TELEPHONE SYSTEM

Johan Claes Georg Borgström and Bernhard Lillsunde, Hagersten, Sweden, assignors to Telefonaktiebolaget L M Ericsson, Stockholm, Sweden, a corporation of Sweden Filed Mar. 28, 1961, Ser. No. 98,944
Claims priority, application Sweden, Apr. 4, 1960, 3,281/60
6 Claims. (Cl. 179—26)

The present invention refers to a circuit arrangement for use in an automatic telephone establishment having a number of sub-exchanges and a main exchange which are connected to each other by means of trunk lines, the purpose of which circuit arrangement is to set up telephone connections between subscribers belonging to the sub-exchanges by means of a register located in the main exchange without using any connecting path through the main exchange.

In order to save the register in the sub-exchanges which comprise selectors and means for setting up connections through the selectors between subscriber's lines belonging to the sub-exchanges or between subscriber's lines and the trunk lines respectively, it is possible for example to arrange in each sub-exchange a local register which is operated by the dialling and which when receiving a certain number of digits determines whether the call intends a subscriber's line belonging to the same sub-exchange or it intends a subscriber which can be reached through a parent exchange. Said solution necessitates in each exchange a number of local registers, the busy condition of which lasts during the dialling so that the real saving will not be too great. It is also possible to send the whole number to the register of the main exchange, which when finding that the subscriber called is located in the same sub-exchange from which the call has been sent, sends the digit signals back by means of voice frequency signals to a code receiver in the originating exchange after which the subscriber by means of the remaining digit signals is connected to the called subscriber and the trunk line is released. In the last-mentioned case the code receiver will be better utilized than the local registers mentioned above, on the other hand an analyzer will be necessary in order to establish where the calling subscriber is located and the analyzer has to be adapted when changing a number respectively when setting up new number groups, which entails high expenses.

The present invention implies an important saving relatively to the solutions known before as neither a local register in the sub-exchange nor an analyzer in the main exchange is necessary.

The circuit arrangement according to the invention is substantially characterized by the fact that the main exchange comprises a register which is adapted to be connected to a trunk line occupied by the calling subscriber, and adapted to register the number of the called subscriber and to send the number of the called subscriber back to the originating exchange, and furthermore that the sub-exchanges comprise signal receivers which receive the signals sent back from the register and which analyse the number received in order to determine whether the called subscriber can be reached without passing through the main exchange, in which case the connection will be set up, and means for signalling to the main exchange if this is not possible.

Figure 1:
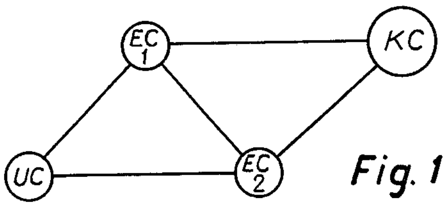
Figure 3:
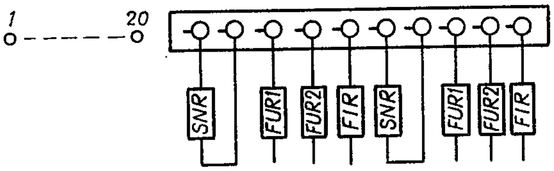
Figure 6:
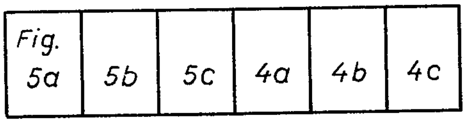
Figure 2:
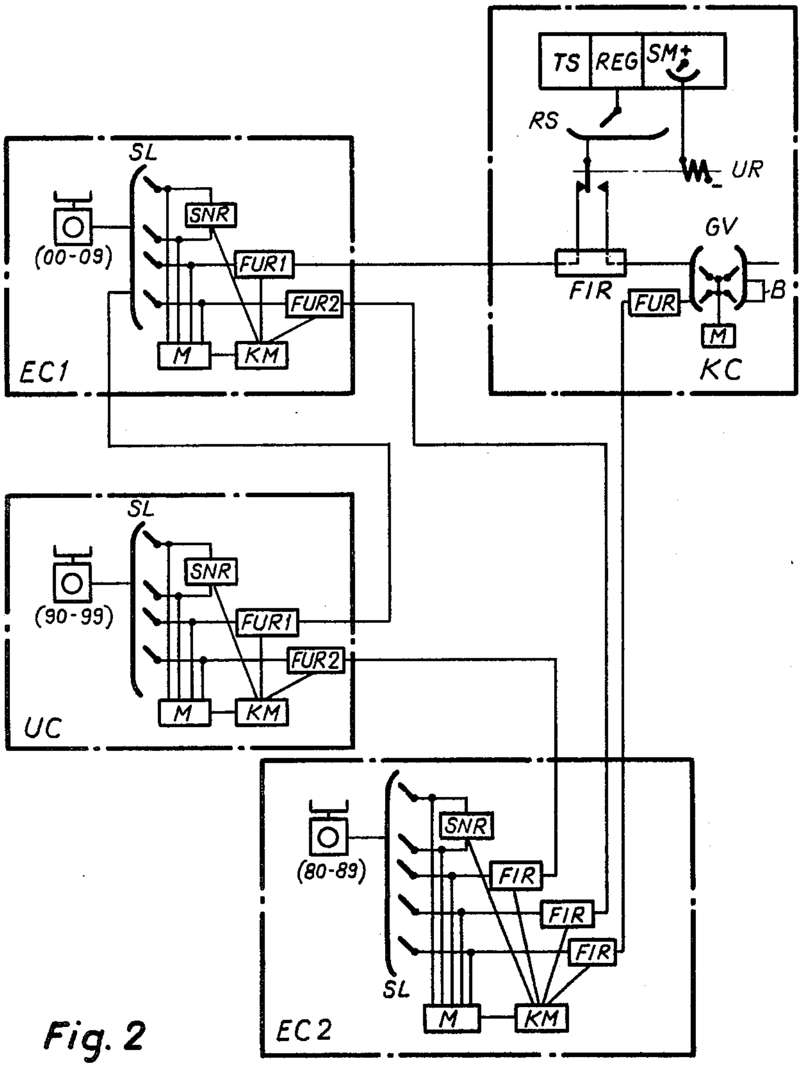
Figure 4A:
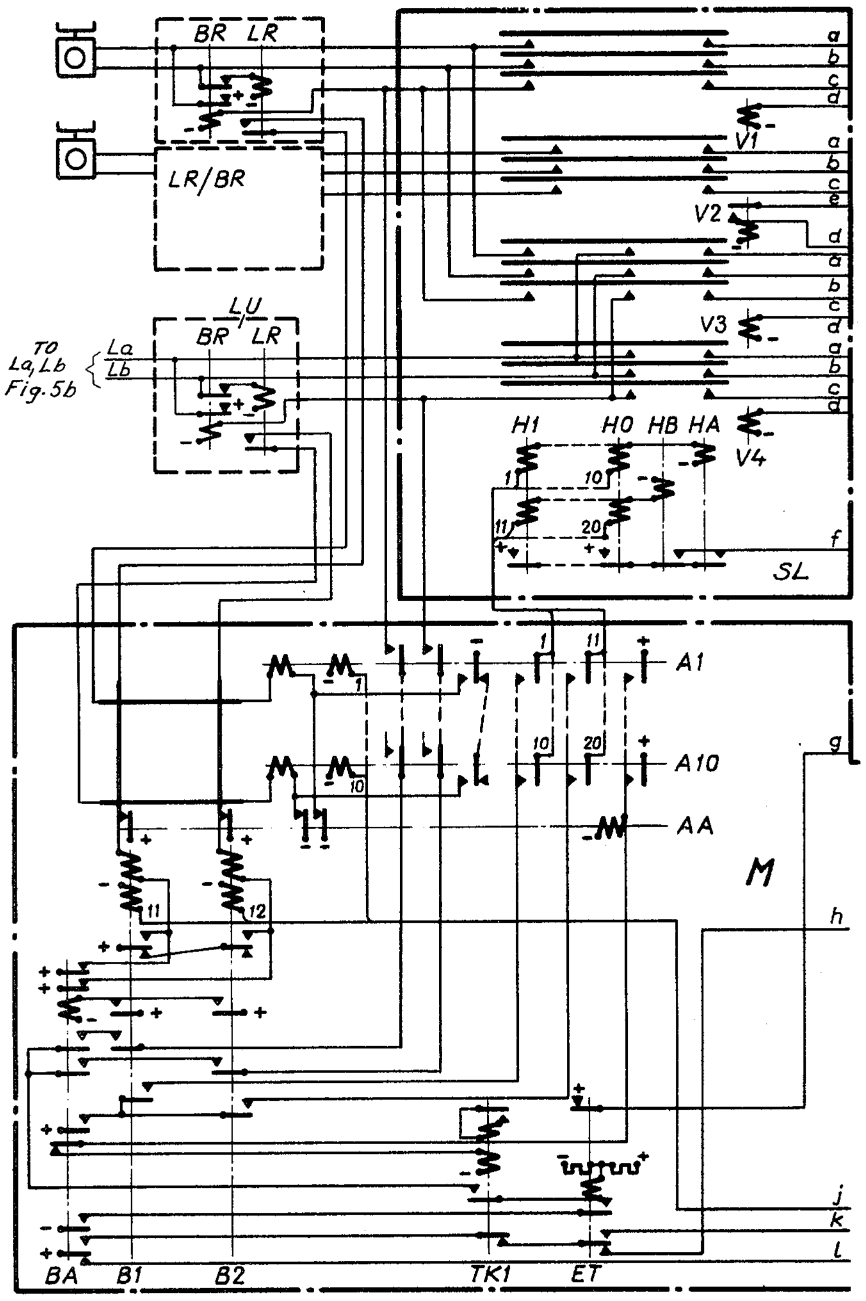
Figure 4B:
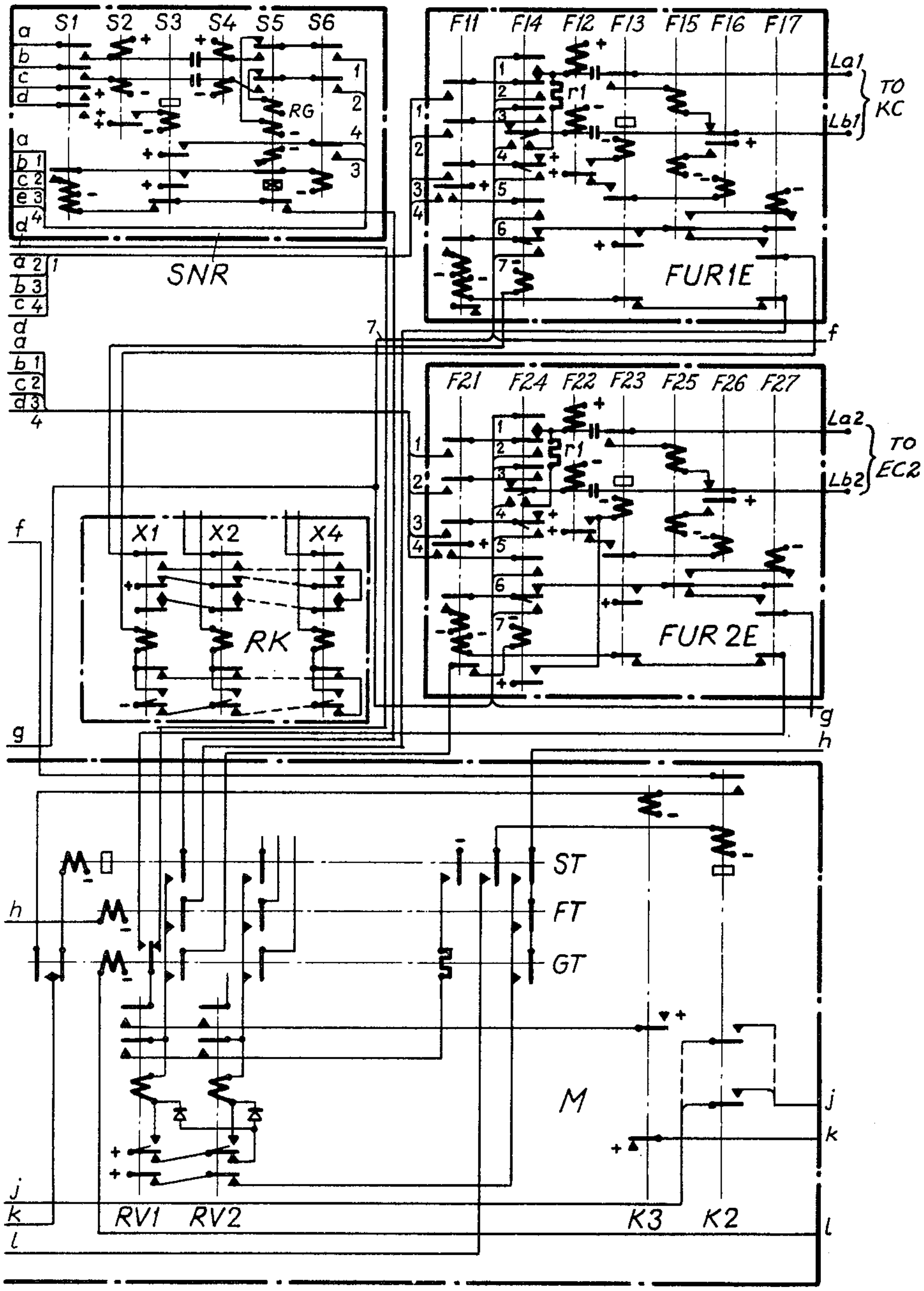
Figure 4C:
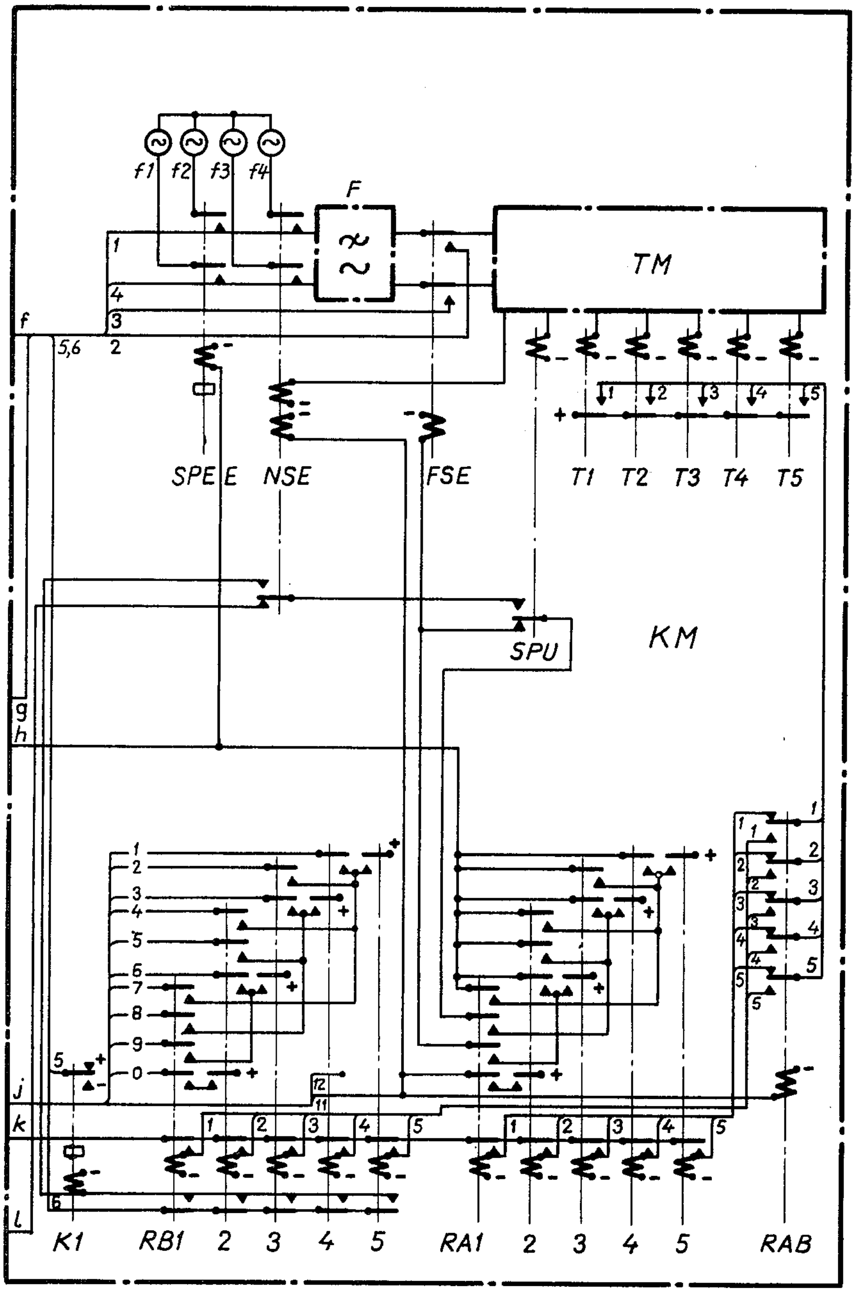
Figure 5A:
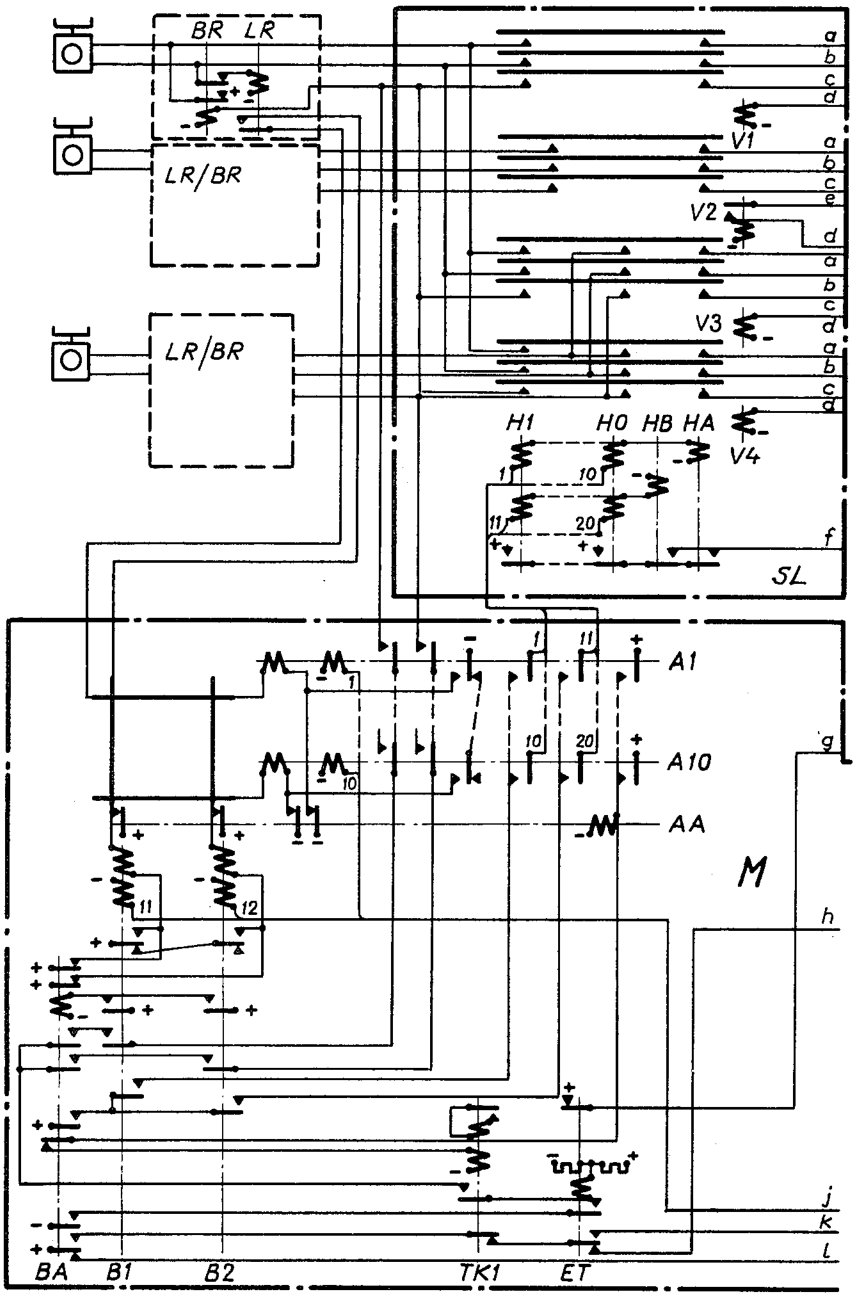
Figure 5B:
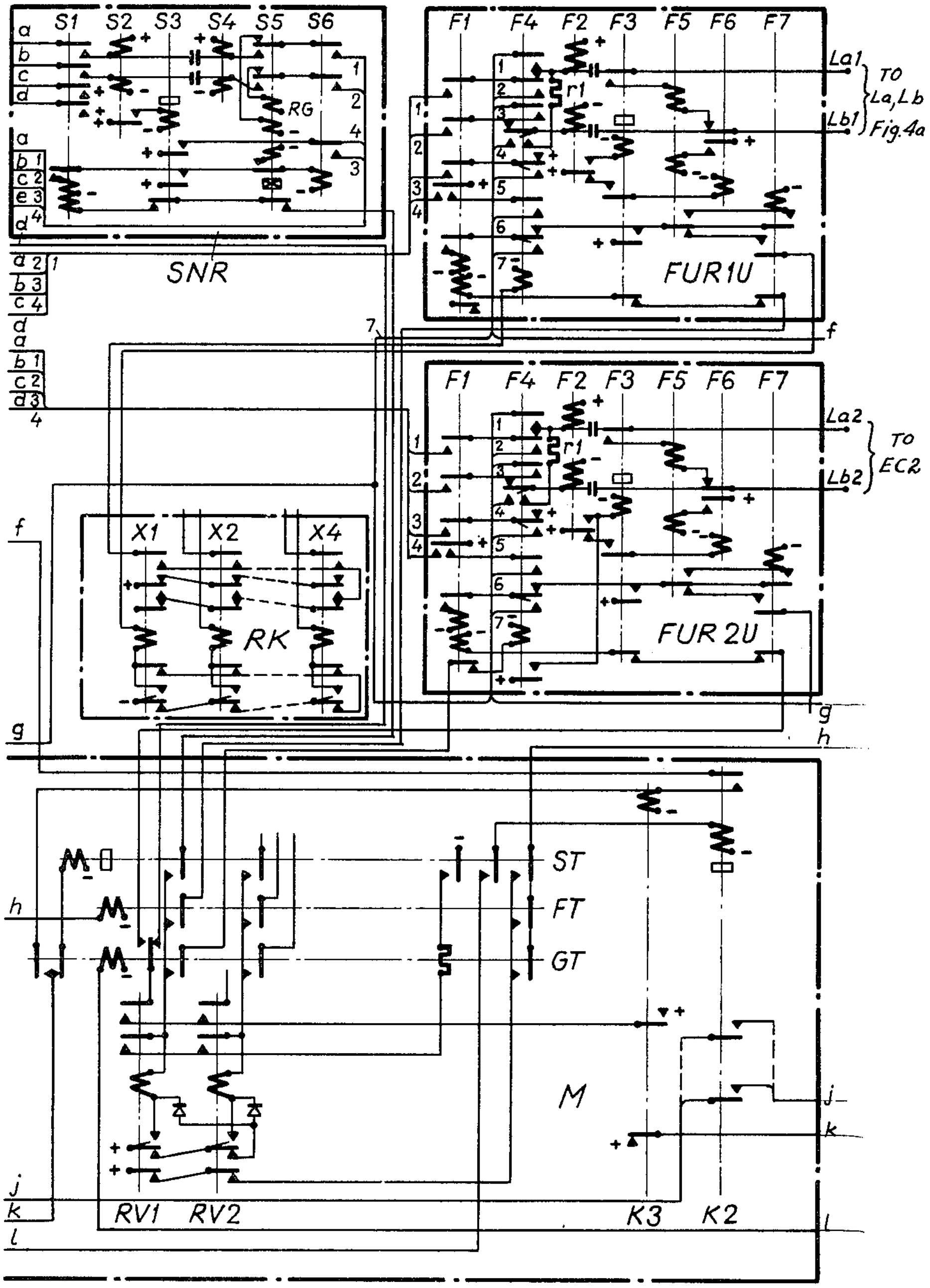
Figure 5C:
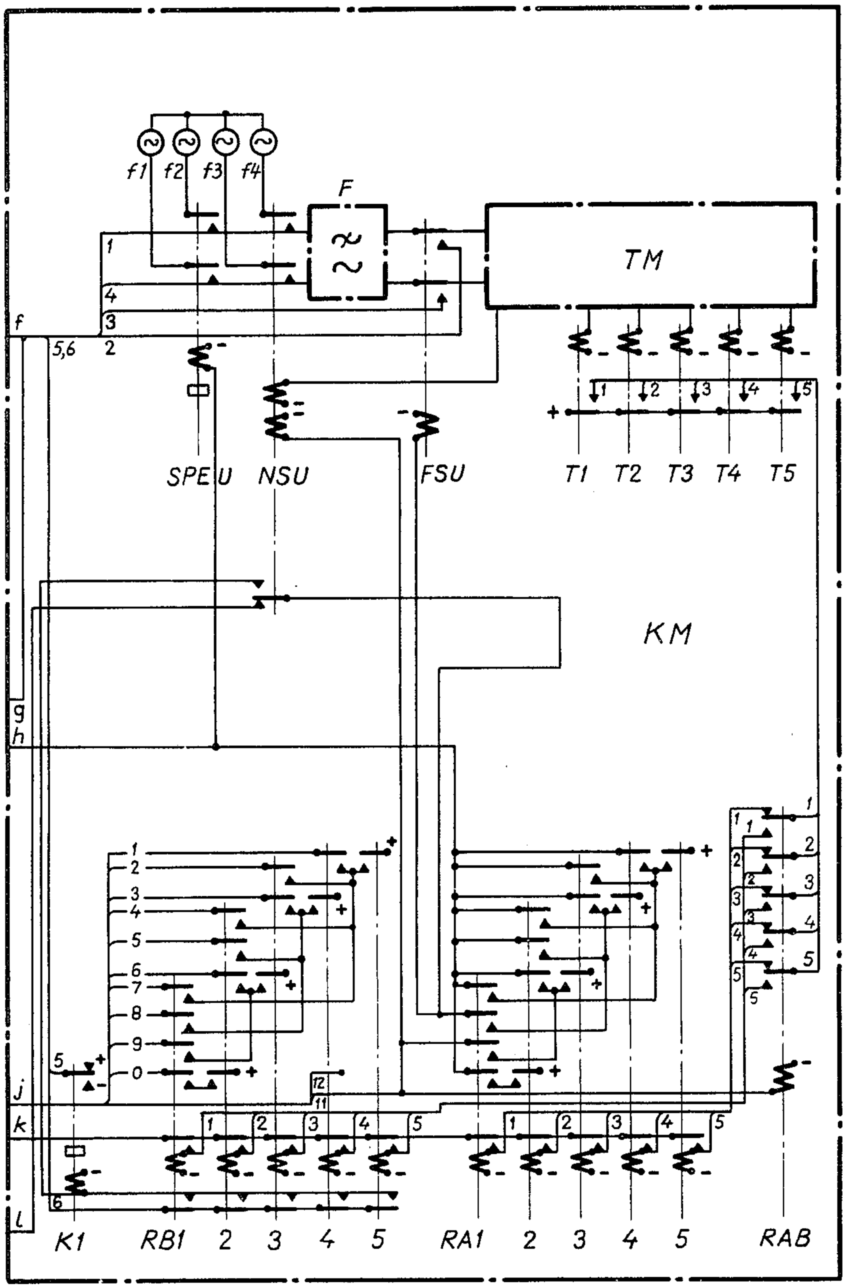

The invention will be explained more in detail by means of some embodiments with reference to the enclosed drawing in which: FIG. 1 shows diagrammatically a network comprising a main exchange and sub-exchanges. FIG. 2 corresponds to FIG. 1 with the difference that the means which establish the connection between the main exchange and the sub-exchanges are diagrammatically shown. FIG. 3 shows the grouping of the selectors in a sub-exchange. FIGS. 4*a–c* show a more detailed circuit diagram of a sub-exchange which has direct trunk lines to the main exchange. FIGS. 5*a–c* show circuit diagrams of a sub-exchange which has no direct connecting path to the main exchange but is the last in a chain of sub-exchanges. Finally FIG. 6 shows the relation of the different drawings.

FIG. 1 shows diagrammatically a network comprising a main exchange KC, two primary sub-exchanges EC1 and EC2 having the subscriber number series 00–09 and 80–89 respectively and a secondary sub-exchange UC having the subscriber number series 90–99. The subscriber number series 10–79 do not belong to the network in question and have to be set up through KC. The purpose is to set up connections between the exchanges UC, EC1 and EC2 by means of a register located in the main exchange, without occupying any trunk line through the main exchange during the conversation. According to FIG. 2 the sub-exchanges are substantially equal to each other and comprise selectors SL, local connecting relay sets SNR, outgoing connecting relay sets FUR1 for connection with the main exchange, outgoing connecting relay set FUR2 for connection with another sub-exchange, incoming connecting relay sets FIR, code receivers KM and a marker M for setting up the connection between the subscriber and a local line or an outgoing line respectively. For the sake of clarity only those connecting relay sets FUR and FIR are shown which are necessary for elucidating the examples. In the main exchange KC the register REG is diagrammatically shown together with a signal receiver SM and a voice frequency sender TS. The signal receiver determines after receiving the number whether the number belongs to another network or to its own network. In the first-mentioned case a relay UR will operate which through its switching contact connects REG respectively its voice frequency sender TS via a calling FIR to an outgoing line in the group selector stage GV while in the last-mentioned case TS will send the signals back to the line. If all the direct connections within the network are blocked, the marker M of the main exchange will set up the connection through the main exchange via the calling FIR, via a GV-line B belonging to the network and an outgoing connecting relay set FUR.

FIG. 3 shows the grouping of the selectors, which according to the example are cross bar selectors. The selector comprises 10 bridges, to the multiple of which the subscribers are connected. The outgoing and ingoing connecting relay sets are connected to certain bridge inputs while the local connecting relay sets are connected simultaneously to two bridge inputs.

According to a first example the calling subscriber as well as the called subscriber belong to the sub-exchange EC1. FIGS. 4*a–c* show a detailed circuit diagram for a sub-exchange having cross bar selectors, in a telephone establishment according to the invention. The means shown in FIG. 2 only in the form of block symbols are shown more in detail. When the subscriber A (FIG. 4*a*) lifts his handset, his line relay LR operates in consequence of which the identifier of the marker will be connected so that it can identify the calling subscriber. At first one of the relays A1–A10 operates by means of plus potential from a break contact of the relay AA, after which the relay AA operates by means of plus potential from a make contact of the operated relay A (FIG. 4*a*). Only one of the A-relays can be maintained operated as a selecting chain is arranged which disconnects the holding potential for all the A-relays excepted one relay, after the operation of the relay A. Now the B-relays can operate but only one of them can be maintained operated after the relay BA has operated secondarily, as a selecting chain interrupts the holding potential for all the other B-relays. According to the example 10 subscribers and 10 lines leading to UC are connected to the identified which is known per se. According to the example it is supposed that the relays A1 and B1 have operated (FIG. 4*a*).

After the relay A1 has operated, the relay TK1 operates secondarily and when the relays A1, AA, B1 and BA have operated, the relay ET will be connected to the *c*-wire of the calling subscriber (FIG. 4*a*). The relay ET is dimensioned in such manner that neither the relay itself nor the cut-off relay BR in the subscriber line equipment, which is connected in series with the winding of the first-mentioned relay and has relatively high resistance, can operate. ET is disconnected from the *c*-wire when the relay TK1 is released with delay owing to the fact that the relay BA has operated. The operation of the relays A and B will determine which bars in the cross bar selector will operate when the make contact of said relays complete a circuit to the respective bar selecting magnet H1 . . . HA in the selector (FIG. 4*a*).

When TK1 releases upon operation of the relay BA, the relay FT operates and connects a selecting relay chain RV1–RV2 to the line equipments of the trunk lines for selection of a trunk line (FIG. 4*b*). One of the RV-relays operates and at the same time the current path for the operation of the other RV-relay is interrupted. It is supposed that the relay RV1 has operated causing operation of the relay F11 in the line equipment FUR1E belonging to the relay RV1 (FIG. 4*b*). This has the consequence that the bridge V3 in the cross bar selector (FIG. 4*a*) belonging to this FUR operates whereby the A-subscriber is connected to the current supply relay F12 in FUR1E. F12 operates and secondarily the relay F13 operates. A make contact of the relay F13 connects the relay F15 to the trunk line whereby a circuit is completed through the winding of the relay F15 and a call is carried out to the main exchange. The relay F15 and secondarily to this the relay F17 operate, F15 obtaining current from the current supply relay in the main exchange. The relay F11 is maintained operated through a make contact of F13. The cut-off relay BR of the A-subscriber (FIG. 4*a*) operates by means of plus potential from the break contact of relay F14 in FUR1E and interrupts the current path for LR, so that the latter releases and the marker will be released. The trunk line is connected through the register finder to the register in the main exchange in consequence of which the A-subscriber obtains exchange tone and dials the number. Upon dialling the relay F16 operates for each dialling pulse and interrupts the loop in the direction of the main exchange. A make contact of F16 prevents the relay F15 to release during the dialling.

When the register has received the entire dial number and has established that the number does not intend a call, which has to pass through another main exchange, the main exchange calls the signal receiver in the sub-exchange by interrupting the direct potential to the latter so that the relay F15 releases in FUR1E. In consequence of this a call is carried out in a selecting chain RK comprising the relays X1–X4 (FIG. 4*b*) of which only one can be maintained operated, i.e. according to the example the relay X1 belonging to FUR1. Secondarily to X1 the relay F14 operates in FUR and connects said relay to the signal receiver KM (FIG. 4*c*).

According to the example voice frequency signalling is used. The trunk line from the main exchange is connected through the wires 1 and 4 to the voice frequency receiver TM of the signal receiver (FIG. 4*c*) which comprises five relays T1–T5 if the voice frequency signalling is carried out by means of two of five frequencies. Simultaneously the *c*-wire of the A-subscriber is switched from FUR1E to the signal receiver (FIG. 4*b*.) The *c*-wire obtains through a conductor 5 plus potential from a break contact of the relay K1 in KM (FIG. 4*c*) so that the relay BR is still in operated condition (FIG. 4*a*). The current supply relay F12 in FUR is held through the resistance *r*1 and F11 is holding itself through the conductor 7 from a break contact of the relay ET in the marker (FIG. 4*a*).

The register in the main exchange now sends the number of the B-subscriber (the ten and the unit) by means of voice frequency code to KM (FIG. 4*c*) upon which the relays T1–T5 operate each for its frequency. When receiving the tens digit two of the relays RA1–RA5 operate secondarily to the T-relays and are maintained operated by means of plus potential from a break contact of the relay K3 in M (FIG. 4*b*). If the tens digit is 0, the relay RAB operates secondarily to the relays RA, switching by means of its switching contacts the current paths and by means of the same plus potential the reverse signal relay NSE operates which through its make contact connects to the trunk line a voice frequency combination requiring sending of the next digit. When two of the relays T operate correspondingly to the units digit, two of the relays RB1–RB5 will operate and will be maintained operated from the same plus potential as the RA-relays. Secondarily to the RB-relays the relay K1 operates and connects through its contact the *c*-wire of the A-subscriber to minus (FIG. 4*c*). In said manner a tens wire and a units wire will be marked with plus potential. As according to the example the exchange comprises only 10 subscribers and 10 lines leading to UC, there are only two tens wires. By connecting minus potential to the *c*-wire the BR-relay is short-circuited and will release (FIG. 4*a*) which causes the LR relay to operate again so that the latter will be identified in the same manner as when the handset was initially lifted. The relay ET (FIG. 4*a*) is again connected to the *c*-wire for testing but the difference relatively to the first identifying will be that now there is minus potential on the *c*-wire from the contact of the relay K1 (FIG. 4*c*), so that ET can operate and will obtain holding through a make contact of BA. The relay ET interrupts the plus potential which through the conductor 7 holds the relay F11 in FUR1E (FIG. 4*b*) so that F11 releases causing releasing of the bridge V3 (FIG. 4*a*) and of all the relays in FUR1E. Thus the trunk line to the main exchange has been released. When TK1 releases, the connecting relay ST operates (FIG. 4*b*) for selection of SNR and the selecting relays RV1–RV2 carry out a test against idle connecting relay sets SNR. It is supposed that RV1 which co-operates with SNR1 (FIG. 4*b*) operates and in series with the winding of RV1 the relay S1 in SNR1 will operate. The relay S1 operates the bridge which belongs to the A-side of the connecting relay set and the A-subscriber will be connected to the current supply relay S2 which operates and causes operation of S3 and S6. The BR-relay of the A-subscriber operates by means of plus potential on a contact of S1 in SNR and interrupts the current circuit for the LR-relay (FIG. 4*a*), so that the marker will be idle, which causes release of all the relays in M. As the relay ST is delayed and could not release immediately, plus potential is connected through the make contact of said relay from a break contact of BA (FIG. 4*a*) to the relay K2 (FIG. 4*b*). The latter operates and connects the plus potential marked tens-and units wire of the signal receiver KM to the identifier, so that the marker causes operation of the bar selecting magnets which correspond to the called number (FIG. 4*a*). The bridge magnet V2 in the bridge connected to the *b*-side of the connecting relay set cannot yet operate as its current path extends from plus potential on a contact of K3 and through make contact of RV1 (FIG. 4*b*). The relay RV1 is held by means of minus potential from a make contact of the slow operating relay ST so that its make contact is still closed when K2 is operated. The relay K3 can now operate by means of plus potential from the bar selecting magnets through a contact of the relay K2. K3 connects plus polarity to the bridge V2 which operates and connects the conductor from SNR to the B-subscriber after which ringing tone is sent from S5. Simultaneously the relay K3 interrupts the holding current for the relays RA and RB in KM (FIG. 4*c*), in consequence of which KM is released when the relay ST in the marker has released.

According to another example a calling subscriber having number 90 and belonging to the sub-exchange UC (FIG. 5*a*) calls a subscriber the number of which begins with the tens digit 8 which indicates that he belongs to the sub-exchange EC2. The subscriber is identified by the marker in UC and a trunk line to the main exchange is occupied through FUR1U exactly as in the case described before. The difference from the case described before resides in that the connection extends through the exchange EC1 which has for each of the trunk lines a line equipment LU (FIG. 4*a*). In the latter a line relay LR is operated when the trunk line is occupied, in such manner that a circuit is completed through the trunk line through the winding of the line relay LR and through the winding of the relay F5 in FUR1U. The connecting process in the exchange EC1 will consequently be exactly the same as when a subscriber belonging to this exchange should have carried out the call. The line equipment is identified and a connecting relay set, for example FUR1E in the exchange EC1 (FIG. 4*b*) is occupied and the main exchange is called exactly in the same manner as described in the example hereabove. The subscriber in the exchange UC now dials the digits upon which the relay F6 in FUR1U and the relay F16 in FUR1E follow the dialing. The register now sends the digits received, back to the originating exchange provided that the number does not intend another network group. At first the first digit which is 8, is sent back to EC1. The signalling is carried out by means of voice frequency signals which are maintained on the line until a continuation signal or disconnect signal has been received. As appears from FIG. 4*c* the current paths through the contacts of the relays RA1–5 are arranged in such manner that when receiving the tens-digit the code receiver can determine that the number does not belong to the terminal exchange EC1. According to the example the subscribers in UC have the tens-digit 9, the subscribers belonging to EC1 have the tens digit 0 and the subscribers belonging to EC2 having the tens digit 8 can be reached as well from UC, EC1 or KC. The tens digits 1–7 intend such exchanges which only can be reached from KC. In the last-mentioned case current paths are completed which influence a blocking relay SPEE (FIG. 4*c*) which connects a voice frequency signal consisting of two voice frequencies, to the conductors 1 and 4 in order to signal that the connection cannot be set up from the main exchange.

When now according to the example the digit has been 8, a current path is completed through the contacts of the relays RA1 and RA4 which current path causes operation of the relay FSE in order to send the voice frequency signals to the originating exchange. Consequently the conductors 1 and 4 are connected to the conductors 2 and 3 (FIG. 4*b*) and through FUR1E in the subexchange EC1 and FUR1U in the sub-exchange UC the lasting voice frequency signal 8 is connected to the code receiver KM (FIG. 5*c*) in the sub-exchange. The code receiver connects operating current through current paths through the make contacts of the relays RA1–4 to the relay GT in the marker (FIG. 5*b*). In this way it is established that the called number does not belong to UC but can be reached from there. The relay GT connects test wires from the FUR2U-connecting relay sets (FIG. 5*b*), through which the terminal exchange EC2 can be reached, to test relays RV1–2 (FIG. 5*b*) and one of the connecting relay sets is selected when one of the RV-relays operates. There is a difference between the FUR2U-connecting relay sets and the FUR1U-connecting relay sets, consisting therein that the relay F4 will be operated simultaneously with selection of the connecting relay set, through a break contact of the F1-relay while the relay F1 operates only when it is established that there is a direct connecting way between UC and EC2. By operation of the relay F4 in FUR2U the conductors 1–7 are connected with each other through make contacts of the relay F4 in FUR2U and FUR2U which indicates that the lasting voice frequency signal 8 is sent through the conductors 1 and 4 in said connecting relay sets to L*a* and L*b* which lead to the primary sub-exchange EC2. If there is an idle connecting path, i.e. if there is an idle FUR2U, the exchange EC2 requires the next digit by operation of the relay NSE in EC2 and sends continuation signal in backward direction. The signal sent in reverse direction is received through the wires 1, 4 by KM in UC (FIG. 5*c*), in consequence of which the relay NSU operates and repeats the signal to EC1 which again repeats the signal to KC. The units-digit is sent from REG via EC1 and UC to EC2. By operation of the relay NSU in UC a current path is completed by means of plus potential through make contacts of the operated RA-relays (which have operated in correspondence to the tens-digit 8) to the relay K1 which operates and connects minus polarity to the wire 5 (FIG. 5*c*) which through contacts of F4 in FUR1U and the *c*-wire is connected to the cut-off relay BR of the calling subscriber (FIG. 5*a*). This cut-off relay releases and connects again the subscriber to the identifier. K1 is delayed in operation so that EC2 has had sufficient time to receive the units-digit and to set up the connection to the called subscriber before the calling subscriber has been connected to the identifier. The bar selecting magnets are operated in the selector in UC, corresponding to the position of the calling subscriber. In this case the relay ET (FIG. 5*a*) was able to operate as it was connected to minus potential obtained on the *c*-wire through the make contacts of the relays BA, B and A. When TK1 releases, minus potential is connected through a break contact of TK1, make contact of ET (FIG. 5*a*) and a make contact of the relay GT, to the relay K3 which operates and connects plus potential through a make contact of GT to the winding of the relay F1 in FUR2U so that the relay F1 operates and connects operating plus to the bridge magnet V4 of that bridge, to the input of which the selected FUR2U is connected. The calling subscriber is connected to said connecting relay set and through the latter to EC2 at the same time as FUR1U is disconnected by operation of the relay ET from the break contact of which the holding current has been connected to F1 in FUR1U through a make contact of F4 in FUR1U. If there is an idle trunk line (FUR2) in UC, the relay SPEE will operate by means of plus potential through make contacts of the relays RV in the marker (FIG. 5*b*) and through a make contact of GT and it sends a blocking signal by means of voice frequency through the wires 1, 4 to EC1 in which the relay SPUE (FIG. 4*c*) operates as a consequence of the blocking signal. The blocking signal is not yet repeated to the main exchange as SPEE cannot operate in EC1 before EC2 has searched whether there is an idle connecting path (FUR2E) in the direction of EC2. The testing is carried out exactly in the same manner as in UC and one of the connecting relay sets FUR2E is selected by operation of one of the RV-relays in the marker. The lasting voice frequency signal corresponding to the tens-digit 8 is now connected to the selected connecting relay set FUR2E. EC2 requires the next digit which causes that the NSE-relay in EC1 (FIG. 4*c*) is operated and it sends backward direction signal to REG. Hereby K1 is operated which re-identifies the line equipment LU exactly in the same way as was the case in UC, in consequence of which the trunk line from UC to EC1 is connected to the trunk line from EC1 to EC2, and FUR1E is released.

If there is no idle connection not either between EC1 and EC2, the relay SPEE in EC1 will operate by means of plus potential through the break contacts of the relays RV and a blocking signal is sent to REG which via KC sets up the connection to EC2. If not either here are found idle paths, a busy tone is sent to the calling subscriber.

If the calling subscriber should have selected the tens-digit 7 which is not located within the range, REG obtains a blocking signal in consequence of the fact that the relay SPEE operates by means of plus potential through make contacts of the operated relays RA in KM. REG knows in this case that the called subscriber cannot be reached via direct lines from the originating exchange. Instead REG can set up the connection via KC. In this manner an analyzer in KC is saved.

As appears from the description hereabove, the fundamental idea of the invention consists therein that REG in the main exchange always sends the digit signals back to the same connecting path through which it has obtained the signals, a test being carried out in each intermediate exchange in order to determine whether the called subscriber is located there, whereupon a test is carried out in order to determine whether the called subscriber is located in the originating exchange. Then a search will be carried out whether there is any idle path from the originating exchange to the addressed exchange and in the opposite case a test is carried out for an idle path from each primary sub-exchange located between the originating exchange and the main exchange. As a last possibility the setting up can be carried out through the main exchange.

The invention is not limited to a telephone system working with cross bar selectors but it refers to telephone systems generally in which a marker is used for setting up the selectors.

We claim:

1. In an automatic telephone system a circuit arrangement for setting up a telephone connection by means of a register for registering signals representing called subscriber numbers located in a main exchange between subscribers belonging to sub-exchanges without a connecting path through the main exchange, said circuit system comprising, in combination, a main exchange, a register in said main exchange for registering signals representing called subscriber numbers a plurality of sub-exchanges, a plurality of subscriber lines associated with each sub-exchange signalling means, trunk lines connecting each sub-exchange with at least another sub-exchange and at least one of said sub-exchanges with the main exchange for establishing a multiple stage connection between a subscriber belonging to any one of said sub-exchanges and the main exchange, each of said sub-exchanges including selectors and marking means for setting up connections between subscriber lines belonging to the same sub-exchange and between subscribers' lines and trunk lines to other exchanges respectively, means in each sub-exchange for generating signals for transmission via a trunk line to said register, said signals representing the number of a subscriber line being called by an associated subscriber line, sending means in the main exchange for sending back through the trunk line occupied by the calling subscriber line signals representing the number registered for the sub-exchange having the calling subscriber line, and signal receivers in said sub-exchanges for receiving the signals sent back from said register, said signal receivers constituting part of said multiple stage connection, said signal receivers having first current paths operated by signals representing subscriber line numbers for which a connection can be set up through the respective sub-exchange, said first current paths rendering the associated marker effective to set up the connection and for releasing said register, and second current paths operated by signals representing subscriber line numbers for which a connection cannot be set up through the sub-exchange, said second current paths operating said signalling means to send blocking signals to said register thereby discontinuing the sending back by the sending means of the signals representing the called subscriber line number.

2. A circuit arrangement according to claim 1 in which said signal receivers comprise means for forwarding the signals representing the called subscriber line received from the register to a preceding stage in the connection.

3. A circuit arrangement according to claim 1 in which said first current paths render the associated marking means effective to operate trunk lines leading to the sub-exchange in which the called subscriber line is located.

4. A circuit arrangement according to claim 1 in which said first current paths render the associated marking means effective to operate connecting relay sets for connecting the calling subscriber line to a called subscriber line located in the same sub-exchange.

5. A circuit arrangement according to claim 1 in which said first current paths operate signal sending means to the register calling for continuation of the sending of the signals representing the called subscriber line.

6. A circuit arrangement according to claim 1 in which the first circuit paths of intermediate sub-exchanges in a multiple stage connection between the calling sub-exchange and the main exchange are not only responsive to signals representing called subscriber line numbers but also include means responsive to blocking signals sent from a sub-exchange more remote from the main exchange for energizing its associated marker to seek a trunk line connected thereto which leads to a sub-exchange having the called subscriber line before forwarding said blocking signal to the next sub-exchange in the multiple stage connection, nearer said main exchange.

References Cited by the Examiner

UNITED STATES PATENTS

| | | | |
|---|---|---|---|
| 2,142,653 | 1/1939 | Peterson | 179—26 |
| 2,261,370 | 11/1941 | Hersey et al. | 179—18 |
| 2,698,879 | 1/1955 | Shepherd | 179—9 X |
| 2,715,658 | 8/1955 | Dunlap et al. | 179—18 |
| 3,087,997 | 4/1963 | Smart | 179—18 |

ROBERT H. ROSE, *Primary Examiner.*

WALTER L. LYNDE, *Examiner.*